(12) United States Patent
Reilly

(10) Patent No.: US 7,014,205 B1
(45) Date of Patent: Mar. 21, 2006

(54) KING PIN COVER SYSTEM

(76) Inventor: Jude M. Reilly, 951 78th Ave. SW., Dodge, ND (US) 58625

( * ) Notice: Subject to any disclaimer, the term of this patent is extended or adjusted under 35 U.S.C. 154(b) by 0 days.

(21) Appl. No.: 10/850,750

(22) Filed: May 20, 2004

(51) Int. Cl.
    *B60D 1/60* (2006.01)
(52) U.S. Cl. .................. 280/507; 150/154; 150/166
(58) Field of Classification Search ............ 280/507; 150/154, 166
    See application file for complete search history.

(56) References Cited

U.S. PATENT DOCUMENTS

| 2,656,706 | A |   | 10/1953 | Lucas et al. ................. 70/232 |
| 2,789,863 | A | * | 4/1957  | Shimabukuro ............ 296/77.1 |
| 4,960,302 | A | * | 10/1990 | Walters ................. 296/100.16 |
| 5,058,914 | A |   | 10/1991 | Murcheson ................ 280/433 |
| 5,536,031 | A |   | 7/1996  | Hurley ..................... 280/507 |
| 5,720,492 | A |   | 2/1998  | Wanzenried ............... 280/433 |
| 5,791,677 | A |   | 8/1998  | Froehlich .................. 280/507 |
| 5,961,140 | A |   | 10/1999 | Huskey ..................... 280/507 |
| 6,039,339 | A |   | 3/2000  | Bello ........................ 280/507 |
| 6,158,758 | A |   | 12/2000 | Schaaf ...................... 280/432 |
| 6,322,094 | B1 |  | 11/2001 | Poe ........................... 280/507 |
| 6,325,121 | B1 | * | 12/2001 | Hudnall ..................... 150/166 |
| 6,412,806 | B1 |  | 7/2002  | Peacock .................... 280/507 |
| 2002/0005654 | A1 | * | 1/2002 | Kolper ...................... 296/136 |

OTHER PUBLICATIONS

Camping World—King Pin Lock, Website Printout, 2 Pages, May 6, 2004.

* cited by examiner

*Primary Examiner*—Tony Winner

(57) ABSTRACT

A king pin cover system for protecting a king pin and individuals from engaging a king pin. The king pin cover system includes a cover having a receiver channel that receives the king pin. A pair of rear straps are attached to the rear portion of the cover for securing the cover to the king pin. One or more sleeves may be attached to the cover for receiving flags.

13 Claims, 7 Drawing Sheets

`US 7,014,205 B1`

KING PIN COVER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to king pins and more specifically it relates to a king pin cover system for protecting a king pin and individuals from engaging a king pin.

2. Description of the Related Art

King pins have been in use for years and are utilized upon $5^{th}$ wheel campers for allowing transporting of the campers by a truck. FIGS. 6 and 7 provide an exemplary king pin commonly utilized in the camper industry. Recently, products have been developed that create a lock on the king pins to prevent the camper from being stolen.

One of the problems with king pins is that extend downwardly from the front of the camper making them susceptible to being accidentally engaged by individuals walking by the camper. An individual engaging a king pin can be easily injured in various locations of their body. Another problem is that king pins are exposed to the elements.

While king pins are suitable for the particular purpose to which they address, they are not designed for protecting individuals from injury. Conventional king pins can injure individuals who accidentally engage the king pins.

In these respects, the king pin cover system according to the present invention substantially departs from the conventional concepts and designs of the prior art, and in so doing provides an apparatus primarily developed for the purpose of protecting a king pin and individuals from engaging a king pin.

BRIEF SUMMARY OF THE INVENTION

In view of the foregoing disadvantages inherent in the known types of king pins now present in the prior art, the present invention provides a new king pin cover system construction wherein the same can be utilized for protecting a king pin and individuals from engaging a king pin.

To attain this, the present invention generally comprises a cover having a receiver channel that receives the king pin. A pair of rear straps are attached to the rear portion of the cover for securing the cover to the king pin. One or more sleeves may be attached to the cover for receiving flags.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a king pin cover system that will overcome the shortcomings of the prior art devices.

A second object is to provide a king pin cover system for protecting a king pin and individuals from engaging a king pin.

Another object is to provide a king pin cover system that may be attached to various styles, designs and sizes of king pins.

An additional object is to provide a king pin cover system that is capable of holding one or more flags.

A further object is to provide a king pin cover system that protects individuals from injuries.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
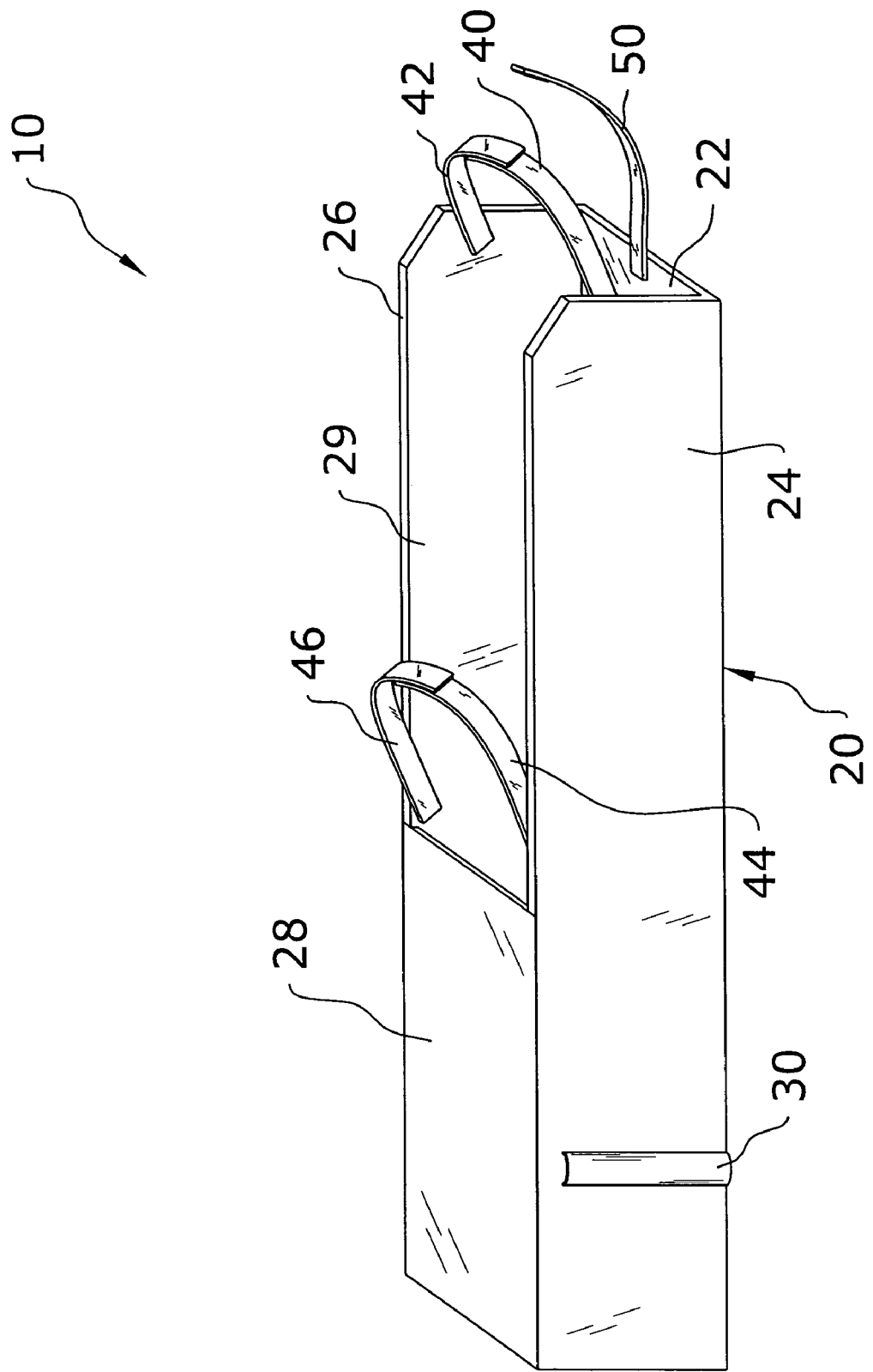
FIG. 1 is an upper perspective view of the present invention.

Turning now descriptively to the drawings, in which similar reference characters denote similar elements throughout the several views, FIGS. 1 through 7 illustrate a king pin cover system 10, which comprises a cover 20 having a receiver channel 29 that receives the king pin 12. A pair of rear straps are attached to the rear portion of the cover 20 for securing the cover 20 to the king pin 12. One or more sleeves 30 may be attached to the cover 20 for receiving flags 60.

B. Cover

Figure 4:
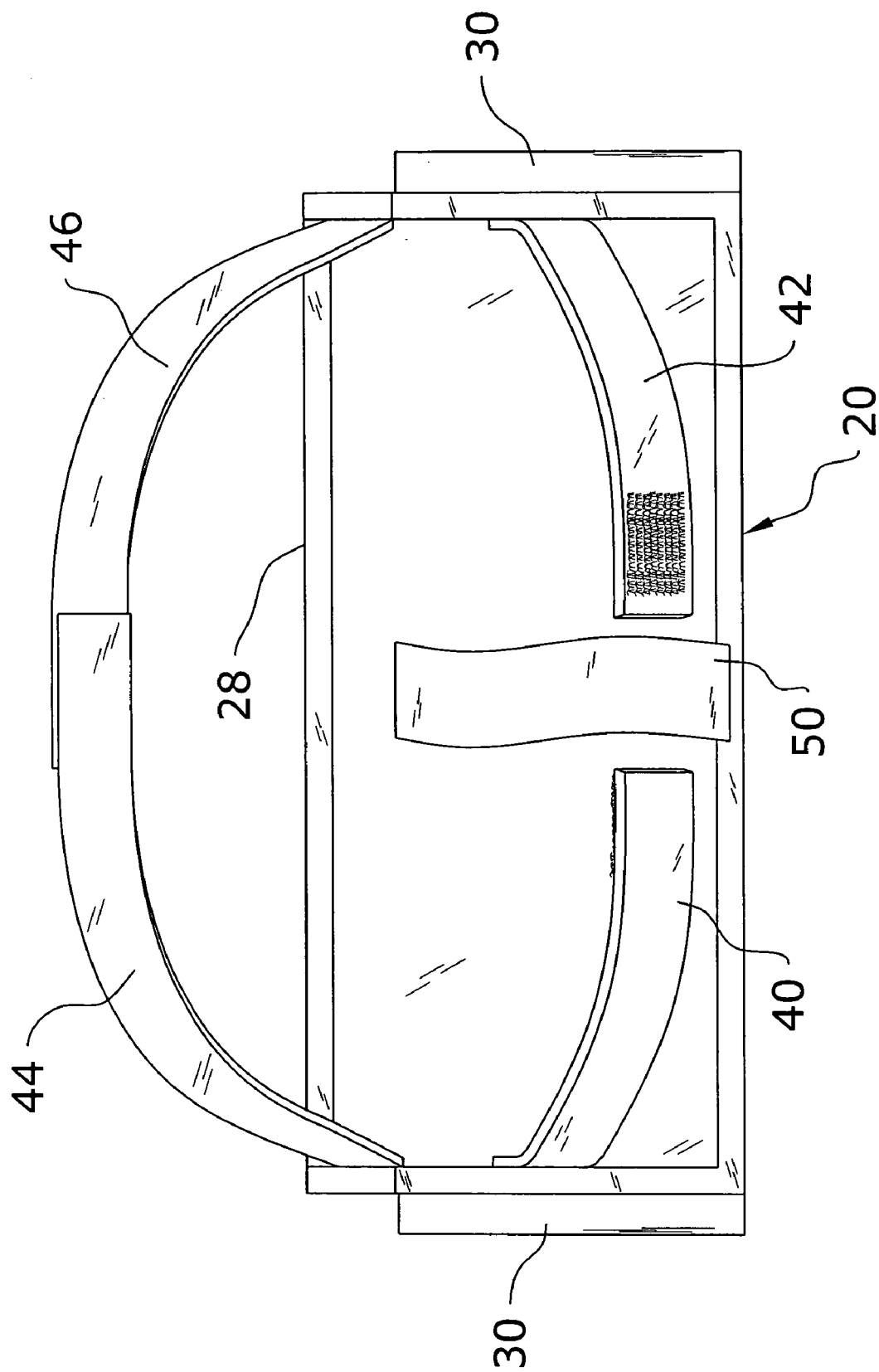
FIG. 4 is a rear end view of the present invention.
Figure 5:
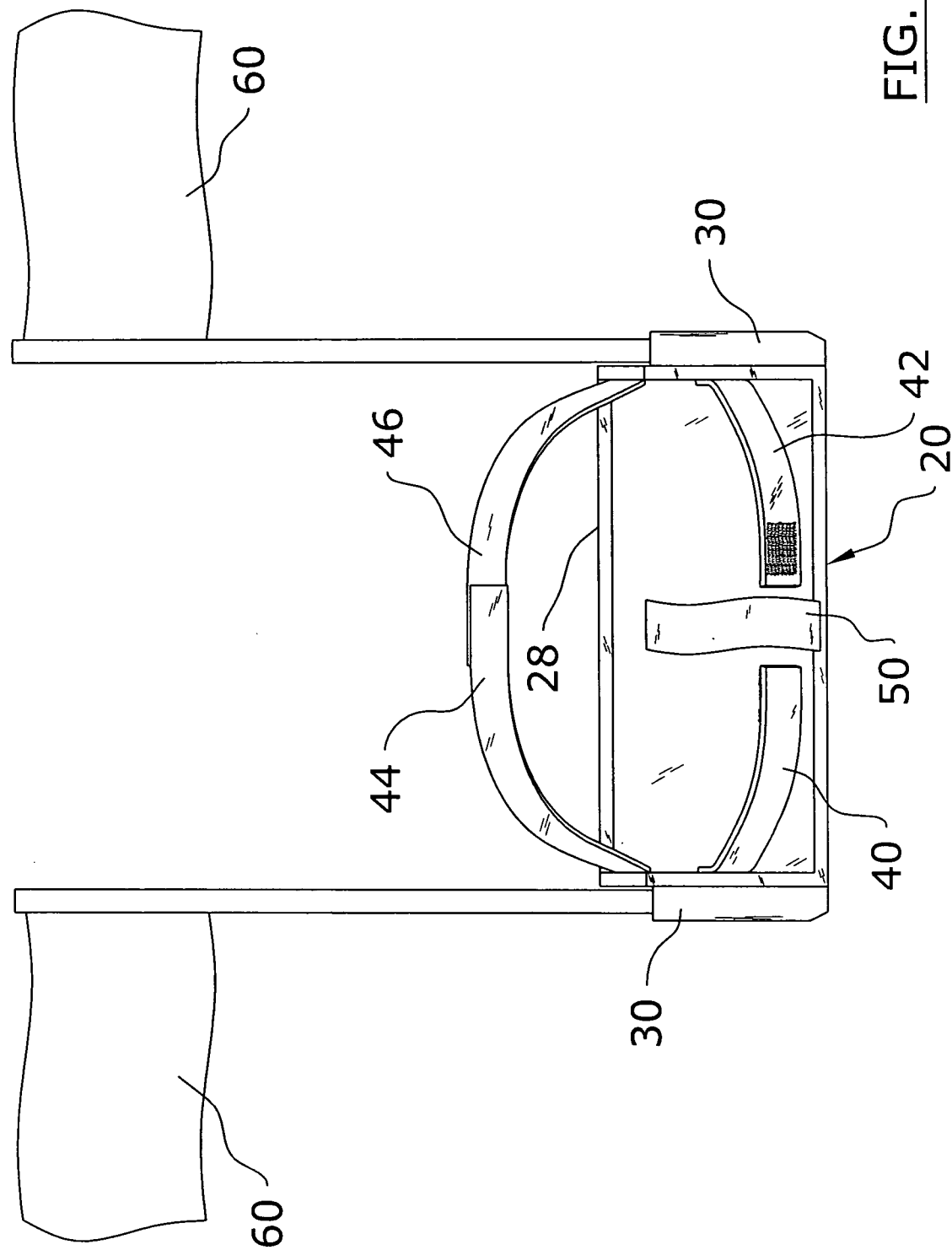
FIG. 5 is a rear end view of the present invention with a pair of flags attached.
Figure 7:
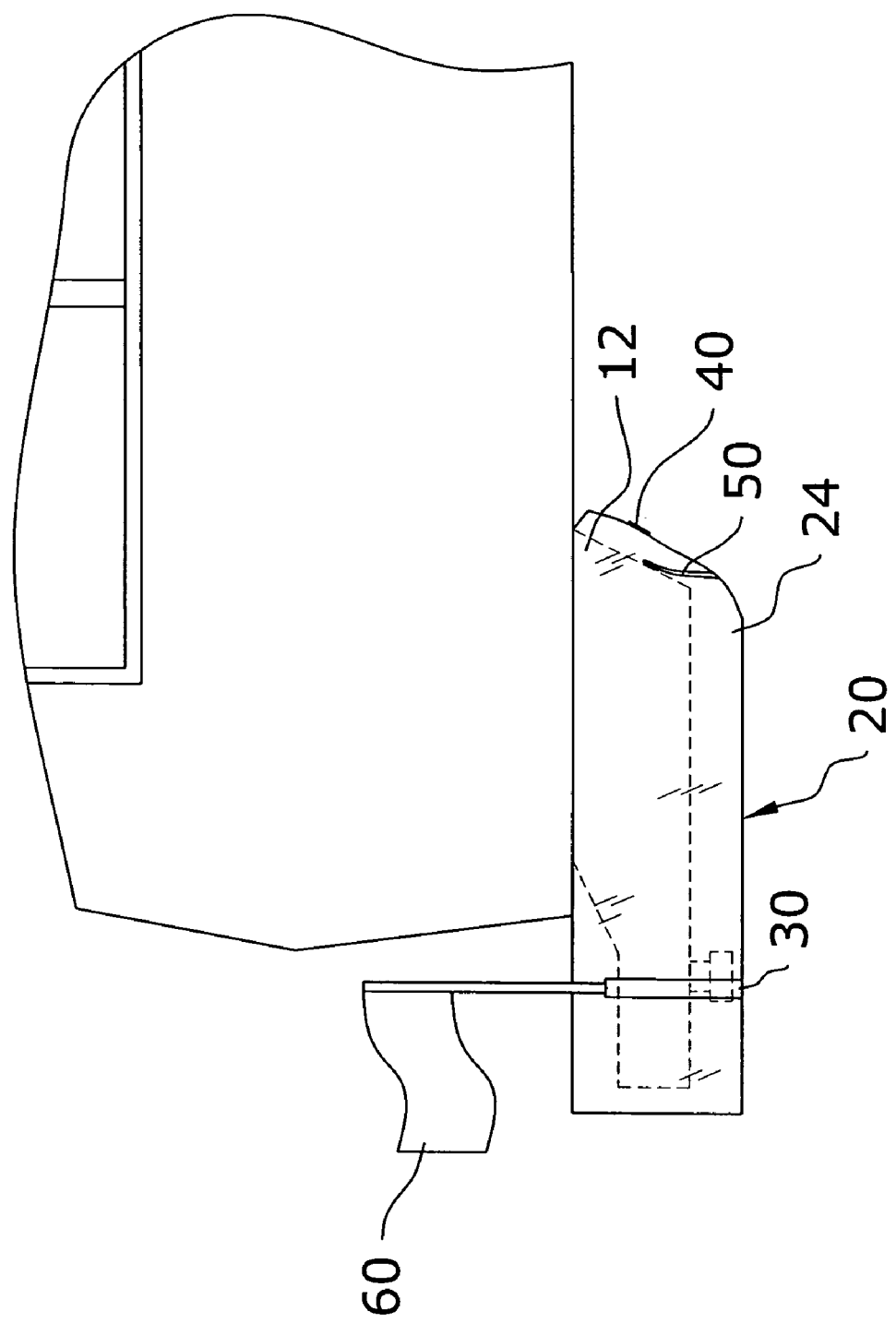
FIG. 7 is a side view of the present invention attached to a king pin.

The cover 20 has a receiver channel 29 that is capable of receiving a king pin 12 as best shown in FIGS. 1, 4 and 5 of the drawings. The receiver channel 29 has a width and height sufficient for receiving various sizes of king pins 12. The cover 20 also has a length sufficient to cover 20 the entire king pin 12 as illustrated in FIG. 7 of the drawings.

Figure 3:
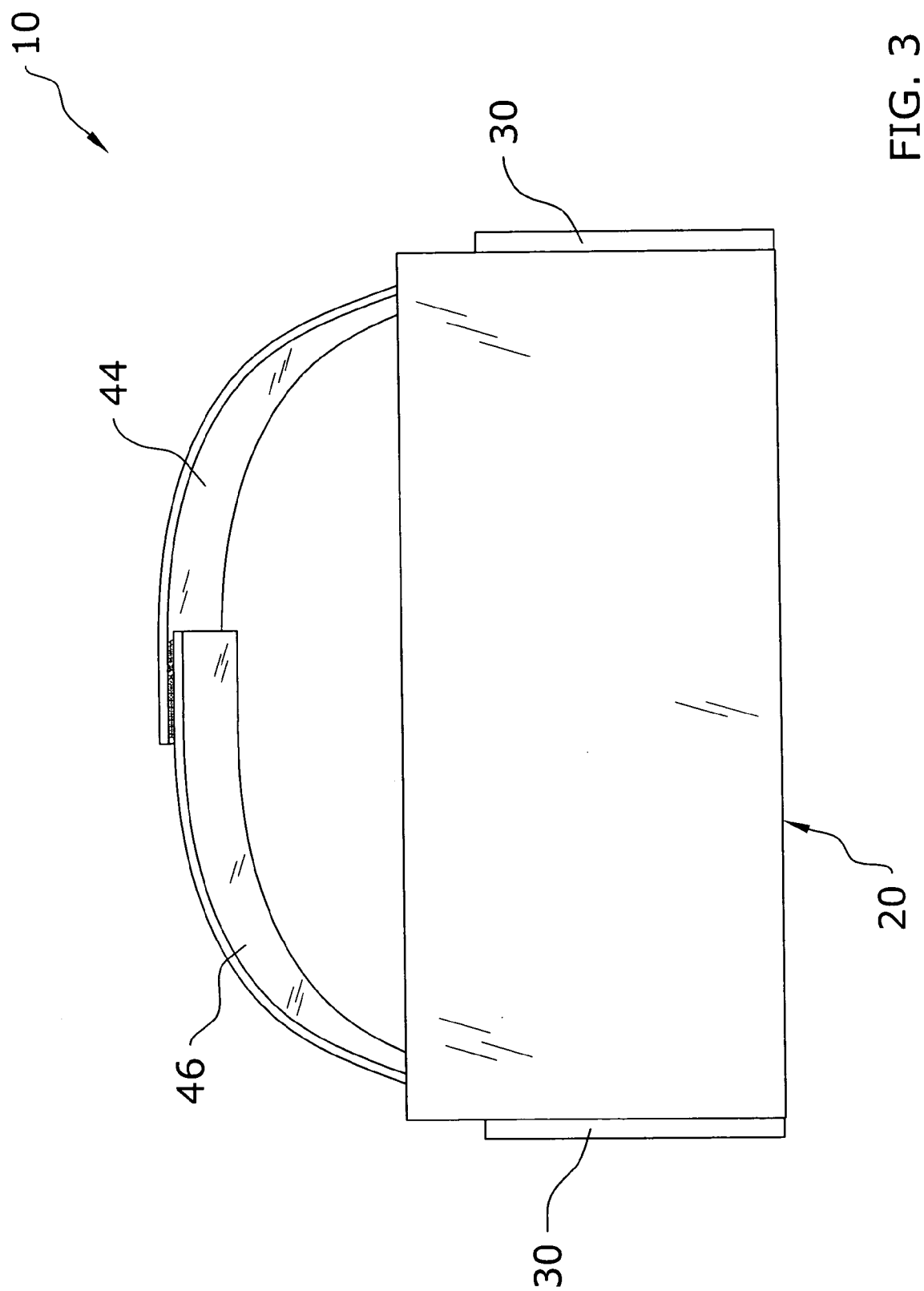
FIG. 3 is a front end view of the present invention.

The cover 20 is preferably comprised of a lower member 22, a first sidewall 24 and a second sidewall 26 extending upwardly from the lower member 22 forming the receiver channel 29, and an upper member 28 attached to an upper end of the sidewalls as best shown in FIGS. 1, 4 and 5 of the drawings. The upper member 28 preferably extends from a front end of the sidewalls to less than half way along the sidewalls as best shown in FIG. 1 of the drawings. The upper member 28 defines an interior cavity that receives a front portion of the king pin 12. The cover 20 preferably includes a front end cap attached to the lower member 22, the upper member 28 and the sidewalls for enclosing the front end of the cover 20 as shown in FIG. 3 of the drawings.

The cover 20 may be comprised of various materials, however the cover 20 is preferably comprised of a flexible material to assist in absorbing impacts by an individual. The cover 20 is preferably comprised of a duck cloth material or similar material. The cover 20 also preferably includes at least one layer of padding (interior and/or exterior).

C. Rear Straps

A pair of rear straps are preferably attached to a rear portion of the cover 20 for securing the cover 20 to a king pin 12. The pair of rear straps 40, 42 are preferably comprised of a flexible material and sufficient in length to extend around the rear portion of the king pin 12 as shown in FIG. 7 of the drawings. The pair of rear straps 40, 42 each preferably include a fastener (e.g. hook and loop) attached to the distal end thereof for securing the rear straps 40, 42 together. It can be appreciated that a single rear strap may be utilized instead of a pair of rear straps 40, 42.

D. End Strap

Figure 2:
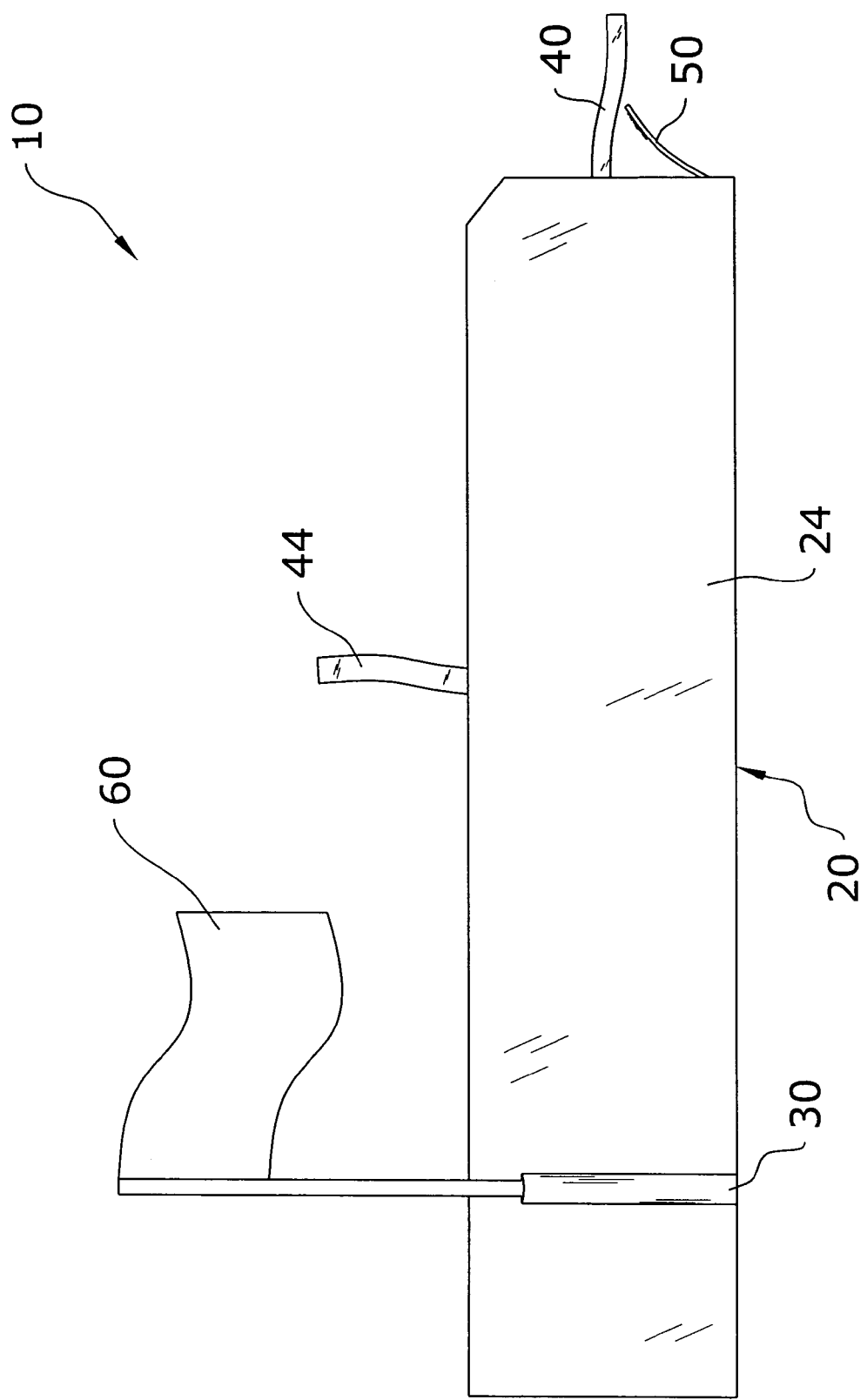
FIG. 2 is a side view of the present invention.

An end strap 50 preferably extends from a rear portion of the cover 20 as shown in FIGS. 1, 2 and 4 of the drawings. The end strap 50 preferably includes a first fastener attached to a distal portion of the end strap 50 with a second fastener (e.g. hook and loop) attached to the bottom of the king pin 12. The first fastener and the second fastener are connectable to one another thereby assisting in retaining the cover 20 upon the king pin 12 as shown in FIG. 7 of the drawings.

E. Carry Strap

A first carry strap 44 and a second carry strap 46 are preferably attached to a middle portion of the cover 20 for allowing an individual to carry the cover 20 as shown in FIGS. 1 and 4 of the drawings. The first carry strap 44 and the second carry strap 46 preferably include fasteners (e.g. hook and loop) for securing the carry straps 44, 46 together. A single carry strap may also be utilized instead of a pair of carry straps 44, 46.

F. Sleeves

As shown in FIGS. 1 through 7 of the drawings, at least one sleeve 30 is attached to the cover 20 for receiving a flag 60 or other device. The sleeves 30 are preferably vertically orientated and are capable of receiving various shaft sizes of flags 60. They flags 60 may serve as decoration, symbolic or warning.

G. Operation of Invention

Figure 6:
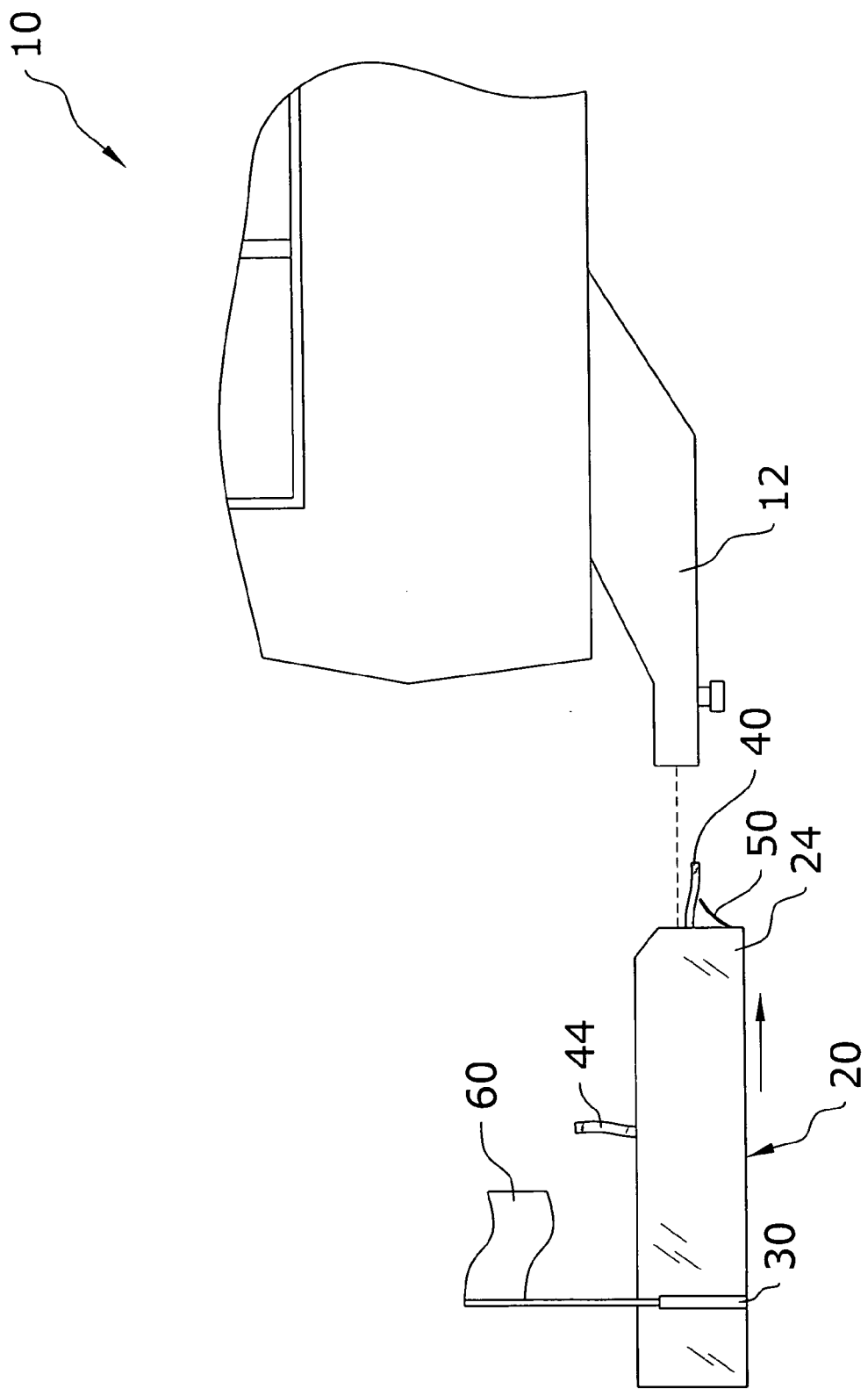
FIG. 6 is an exploded side view of the present invention with respect to a king pin.

To attach the present invention to the king pin 12, the user positions the cover 20 in front of the king pin 12 as shown in FIG. 6 of the drawings. The user then slides the cover 20 upon the king pin 12 wherein the king pin 12 is received within the receiver channel 29 of the cover 20. The user positions the cover 20 upon the king pin 12 until the cover 20 cannot be moved rearwardly any further as shown in FIG. 7 of the drawings.

The user then secures the rear straps 40, 42 about the rear portion of the king pin 12 for retaining the cover 20 upon the king pin 12. The user may also fasten the end strap 50 to the king as further shown in FIG. 7 of the drawings. In addition, one or more flags 60 may be removably positioned within the sleeves 30 attached to the cover 20 as shown in FIGS. 6 and 7 of the drawings. The cover 20 absorbs the impacts of individuals accidentally engaging the king pin 12 thereby preventing injury to the person. The cover 20 also prevents damage to the king pin 12 by objects engaging the king pin 12 and the elements.

To remove the cover 20, the user simply removes the rear straps 40, 42 and the end strap 50 from about the king pin 12. The user is then able to slide the cover 20 forwardly off the king pin 12 for a complete removal of the cover 20. The user may then grasp the carry straps 44, 46 to conveniently transport the cover 20 to a different location.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A king pin cover system, comprising:
    a cover having a receiver channel capable of receiving a king pin, wherein said cover is comprised of:
        a lower member;
        a first sidewall and a second sidewall extending upwardly from said lower member forming said receiver channel; and
        an upper member attached to an upper end of said sidewalls, wherein said upper member extends from a front end of said sidewalls to less than half way along said sidewalls;
    a front end cap attached to said lower member, said upper member and said sidewalls;
    a first carry strap and a second carry strap attached to said cover for allowing an individual to carry said cover;
    an end strap extending from a rear portion of said cover;
    a first fastener attached to a distal portion of said end strap and a second fastener attachable to a king pin, wherein said first fastener and said second fastener are connectable to one another; and
    a pair of rear straps attached to a rear portion of said cover for securing said cover to a king pin.

2. The king pin cover system of claim 1, wherein said pair of rear straps are comprised of a flexible material.

3. The king pin cover system of claim 1, wherein said pair of rear straps each include a distal fastener for securing said rear straps together.

4. The king pin cover system of claim 1, wherein said cover is comprised of a flexible material.

5. The king pin cover system of claim 4, wherein said cover is comprised of duck cloth.

6. The king pin cover system of claim 1, wherein said cover includes a layer of padding.

7. The king pin cover system of claim 1, including at least one sleeve attached to said cover for receiving a flag.

8. A king pin cover system, comprising:
a cover having a receiver channel capable of receiving a king pin, wherein said cover is comprised of:
- a lower member;
- a first sidewall and a second sidewall extending upwardly from said lower member forming said receiver channel; and
- an upper member attached to an upper end of said sidewalls, wherein said upper member extends from a front end of said sidewalls to less than half way along said sidewalls;

a front end cap attached to said lower member, said upper member and said sidewalls;
a first carry strap and a second carry strap attached to said cover for allowing an individual to carry said cover;
a pair of rear straps attached to a rear portion of said cover for securing said cover to a king pin;
at least one sleeve attached to said cover for receiving a flag;
an end strap extending from a rear portion of said cover; and
a first fastener attached to a distal portion of said end strap and a second fastener attachable to a king pin, wherein said first fastener and said second fastener are connectable to one another.

9. The king pin cover system of claim 8, wherein said pair of rear straps are comprised of a flexible material.

10. The king pin cover system of claim 8, wherein said pair of rear straps each include a distal fastener for securing said rear straps together.

11. The king pin cover system of claim 8, wherein said cover is comprised of a flexible material.

12. The king pin cover system of claim 11, wherein said cover is comprised of duck cloth.

13. The king pin cover system of claim 8, wherein said cover includes a layer of padding.

* * * * *